(12) United States Patent
Yamada

(10) Patent No.: US 6,972,970 B2
(45) Date of Patent: Dec. 6, 2005

(54) DC-TO-DC CONVERTER

(75) Inventor: Tomoyasu Yamada, Niiza (JP)

(73) Assignee: Sanken Electric Co., Ltd., (JP)

( * ) Notice: Subject to any disclaimer, the term of this patent is extended or adjusted under 35 U.S.C. 154(b) by 0 days.

(21) Appl. No.: 11/071,559

(22) Filed: Mar. 3, 2005

(65) Prior Publication Data
US 2005/0146901 A1    Jul. 7, 2005

Related U.S. Application Data

(63) Continuation of application No. PCT/JP03/10634, filed on Aug. 22, 2003.

(30) Foreign Application Priority Data

Sep. 4, 2002   (JP)   .............................. 2002-259290

(51) Int. Cl.[7] .......................................... H02M 3/335
(52) U.S. Cl. .............................. 363/21.16; 363/21.08; 363/41
(58) Field of Search ............................ 363/16, 21.01, 363/21.07, 21.08, 21.11, 21.16, 21.18, 40, 363/41, 97, 124, 131

(56) References Cited

U.S. PATENT DOCUMENTS 5,455,757 A * 10/1995 Nguyen et al. .......... 363/21.16
6,111,762 A * 8/2000 Igarashi et al. .......... 363/21.16
6,366,479 B1   4/2002 Usui et al. ................ 363/21.12
2004/0125620 A1 * 7/2004 Yamashita ............... 363/21.01

FOREIGN PATENT DOCUMENTS

| JP | 08-103075 | 4/1996 |
| JP | 08-126308 | 5/1996 |
| JP | 2002-209380 | 7/2002 |
| JP | 2002-218749 | 8/2002 |

* cited by examiner

*Primary Examiner*—Jessica Han
(74) *Attorney, Agent, or Firm*—Woodcock Washburn LLP

(57) ABSTRACT

A transformer has a primary winding connected between a pair of dc input terminals via a switch, a secondary winding connected between a pair of output terminals via a first rectifying and smoothing circuit, and a tertiary winding connected to a second rectifying and smoothing circuit for feeding a switch control circuit. Included in the switch control circuit is a switch control pulse generator circuit whereby the switch is driven to provide a constant dc voltage at the output terminals. A mode selector circuit is connected to the switch control pulse generator circuit to cause the switch to be driven continuously under normal load, and at intervals under light load. The intermittent driving of the switch is suspended, and the switch driven continuously, in the event of a drop in the output voltage of the second rectifying and smoothing circuit to a predefined value during operation in light load mode.

8 Claims, 8 Drawing Sheets

DC-TO-DC CONVERTER

CROSS REFERENCE TO RELATED APPLICATIONS

This is a continuation of Application PCT/JP03/10634, filed Aug. 22, 2003, which claims priority to Japanese Patent Application No. 2002-259290 filed Sep. 4, 2002.

BACKGROUND OF THE INVENTION

This invention relates generally to dc-to-dc converters which convert one unidirectional voltage into another and, more particularly, to a dual-mode dc-to-dc converter wherein the voltage regulator switch for holding the output voltage constant is driven (i.e. turned on and off) continuously under normal load and at intervals under light load, with a view to reduction of switching loss. Still more particularly, the invention deals with how to override the light load mode when the power requirement of the load becomes still lower.

The dc-to-dc converter of the type herein under consideration generally comprises a transformer having a primary winding connected across a dc power supply, and a secondary winding connected across a load via a rectifying and smoothing circuit. Connected in series with the transformer primary, the voltage regulator switch such as a field-effect transistor is driven on and off under the direction of a switch control circuit. The transformer has a tertiary winding connected to the supply terminals of the switch control circuit via a second rectifying and smoothing circuit. The first recited rectifying and smoothing circuit is for delivery of dc power to the load, and the second rectifying and smoothing circuit for delivery of dc power to the switch control circuit.

It has been suggested in connection with the dc-to-dc converter of the foregoing general configuration to drive the voltage regulator switch at intervals under light load for higher efficiency. The intermittent switch driving is intended to make the number of switchings drastically less per unit length of time than when the switch is driven continuously regardless of load magnitude. The reduction of switchings per unit length of time is tantamount to the reduction of switching loss and hence to a higher overall efficiency of the converter.

Such intermittent driving of the voltage regulator switch under light load has had some difficulties left unresolved. The difficulties arise from the fact that, in the first rectifying and smoothing circuit which powers the load as aforesaid, the voltage across the smoothing capacitor rises during each switching period (i.e. period of time during which the switch is driven) and diminishes during the ensuing nonswitching period. The supply voltage fed from the second rectifying and smoothing circuit to the switch control circuit also rises during each switching period and dwindles during each nonswitching period. The voltage drop across the smoothing capacitor of the first rectifying and smoothing circuit becomes slower when the power requirement of the load is very low. Contrastively, since the switch control circuit consumes power independently of the load, the voltage across the smoothing capacitor of the second rectifying and smoothing circuit declines at nearly the same rate irrespective of the power requirement of the load.

In short, under extremely light load, the rate of the voltage drop across the smoothing capacitor of the second rectifying and smoothing circuit for the switch control circuit is greater than that of the voltage drop across the smoothing capacitor of the first rectifying and smoothing circuit for the load. The switch control circuit goes out of operation when the voltage across the smoothing capacitor of the second rectifying and smoothing circuit drops below the prescribed limit. Once set out of operation, the switch control circuit resumes operation after a restart period of, generally, the order of several hundred milliseconds. The smoothing capacitors of both first and second rectifying and smoothing circuits are not charged during the restart periods, so that the voltages across these capacitors further lessens, making it difficult or even impossible to feed the load as required.

It might be contemplated to obviate these difficulties by employing a transformer tertiary of a greater number of turns for feeding the switch control circuit, and a smoothing capacitor of greater capacitance for the second rectifying and smoothing circuit. These solutions are objectionable because such a transformer tertiary and such a smoothing capacitor would incur greater power losses. Another obvious remedy might be to shorten the nonswitching periods in intermittent drive mode explained above. To make the nonswitching periods shorter, however, is to make more switchings per unit length of time and thus to run counter to the primary objective of higher efficiency through curtailment of switching loss.

SUMMARY OF THE INVENTION

The present invention has it as an object to totally defeat the difficulties and inconveniences heretofore encountered in conjunction with dual-mode dc-to-dc converters of the kind in question.

A more specific object of the invention is to automatically override the intermittent driving of the voltage regulator switch in the event of an abnormal drop in the supply voltage of the switch control circuit and hence to assure the proper operation of the switch control circuit in light load mode.

Briefly, the present invention may be summarized as a dc-to-dc converter operating in either normal load mode or light load mode depending upon the power requirement of a load, with a capability of automatically overriding the light load mode under extremely light load. The dc-to-dc converter is broadly comprised of a dc-to-dc converter circuit of mostly prior art design including a switch, and a switch control circuit incorporating the novel concepts of this invention for controllably driving the switch. The dc-to-dc converter circuit includes a transformer connected to dc input means via the switch, and to dc output means via a first rectifying and smoothing circuit for supplying dc power to the load connected to the dc output means. A second rectifying and smoothing circuit is also connected to the transformer.

Powered by the second rectifying and smoothing circuit of the dc-to-dc converter circuit, the switch control circuit comprises a switch control pulse generator circuit for generating switch control pulses thereby to controllably drive the switch according to the power requirement of the load. A mode selector circuit is connected to the switch control pulse generator circuit for causing the same to drive the switch in normal load mode, in which the switch control pulses are applied to the switch continuously, when the power requirement of the load is above a predefined value, and in light load mode, in which the switch control pulses are applied to the voltage regulator switch at intervals, when the power requirement of the load is below the predefined value. A light load mode override circuit is connected between the second rectifying and smoothing circuit of the dc-to-dc converter circuit and the switch control pulse generator circuit for overriding the light load mode, and causing the switch control circuit to apply the switch control pulses to the switch continuously, when an output voltage of the second rectifying and smoothing circuit of the dc-to-dc converter circuit falls below a predefined value.

Thus, during operation in light load mode, the light load mode override circuit is tripped when the output voltage of the second rectifying and smoothing circuit falls to a predefined value which is not less than a minimum allowable value at which the switch control circuit is capable of operation. The light load mode override circuit when tripped causes the voltage regulator switch to be driven continuously until the output voltage of the second rectifying and smoothing circuit returns to normal. The switch control circuit is thus kept from going out of operation due to a drop in the output voltage of the second rectifying and smoothing circuit.

It will be appreciated that the supply voltage of the switch control circuit is not to fall below the allowable minimum no matter how long the switch is driven in light load mode. The switch is cyclically driven for a preassigned period of time and not driven for another preassigned period of time in light load mode. The ratio of these driven and undriven periods may therefore be determined for the highest possible power efficiency of the converter.

The above and other objects, features and advantages of this invention will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
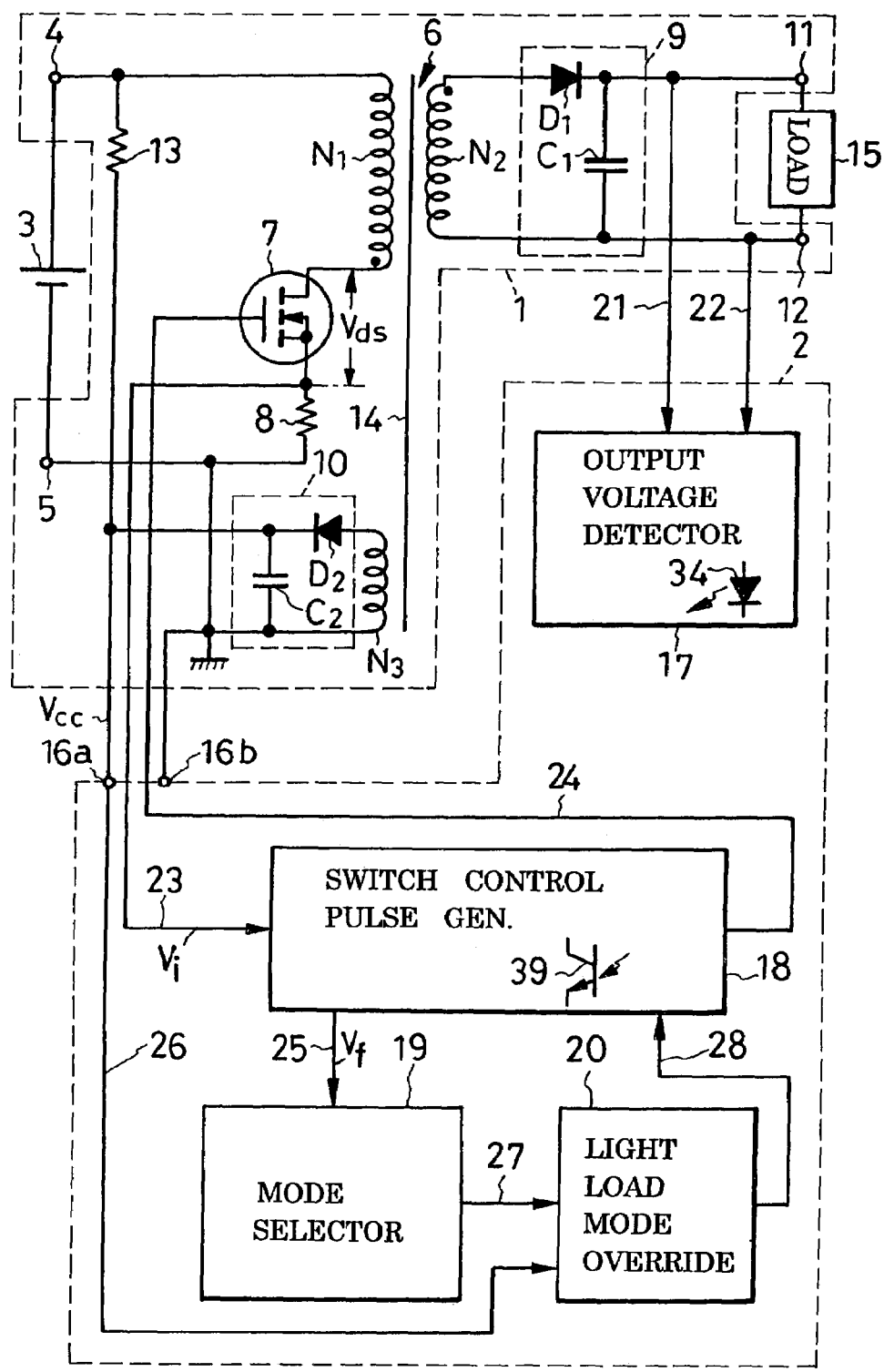
FIG. 1 is a schematic electrical diagram, partly in block form, of a first preferred form of dual-mode dc-to-dc converter embodying the principles of this invention.

The present invention is currently believed to be best embodied in the dual-mode, flyback dc-to-dc converter illustrated in FIG. 1 of the drawings above. The representative dc-to-dc converter is notionally or functionally divisible into a dc-to-dc converter circuit 1 and a switch control circuit 2 for the purposes of this invention. The dc-to-dc converter circuit 1 comprises:

1. A pair of dc input terminals 4 and 5 which are shown connected to a dc power supply 3.
2. A pair of dc output terminals 11 and 12 which are shown connected to a load 15 to be powered.
3. A transformer 6 comprising a primary winding $N_1$ which has its opposite extremities connected to the pair of dc input terminals 4 and 5 as dc input means, a secondary winding $N_2$ which has its opposite extremities connected to the pair of dc output terminals 11 and 12 as dc output means, and a tertiary winding $N_3$.
4. A switch 7, shown as a field-effect transistor, connected between the pair of dc input terminals 4 and 5 via the transformer primary $N_1$.
5. A current detect resistor 8 as gradient voltage generator means connected between the switch 7 and the grounded dc input terminal 5 for providing a voltage signal $V_i$ (hereinafter referred to as the current detect signal) indicative of the magnitude of the current flowing through the transformer primary $N_1$ and switch 7.
6. A first rectifying and smoothing circuit 9 connected between the transformer secondary $N_2$ and the pair of dc output terminals 11 and 12.
7. A second rectifying and smoothing circuit 10 connected to the transformer tertiary $N_3$ for powering the switch control circuit 2.
8. A startup resistor 13 connected to the dc input terminal 4.

The dc power supply 3 may take the form of a rectifying and smoothing circuit in practice, which, by being connected to a commercial ac power supply, provides an unstabilized dc voltage. Other sources of dc voltage may be employed in place of the rectifying and smoothing circuit, an example being a battery.

The transformer 2 has all the three windings $N_1$–$N_3$ coiled upon a magnetic core 14 and electromagnetically coupled to one another. Connected to the transformer secondary $N_2$, the first rectifying and smoothing circuit 9 comprises a rectifying diode $D_1$ and smoothing capacitor $C_1$. The smoothing capacitor $C_1$ is connected in parallel with the transformer secondary $N_2$ via the rectifying diode $D_1$, besides being connected between the pair of dc output terminals 11 and 12. The load 15 shown connected between the pair of dc output terminals 11 and 12 is understood to make a power requirement that broadly switches between normal and light load. The switch 7 as the main switch or voltage regulator switch of the dc-to-dc converter is connected in series with the primary winding $N_1$.

The second rectifying and smoothing circuit 10, which serves as power supply for the switch control circuit 2, likewise comprises a rectifying diode $D_2$ and smoothing capacitor $C_2$. The smoothing capacitor $C_2$ is connected in parallel with the transformer tertiary $N_3$ via the rectifying diode $D_2$. Additionally, the smoothing capacitor $C_2$ is connected on one hand both to the dc input terminal 4 via the startup resistor 13 and to the first supply terminal $16_a$ of the switch control circuit 2. On the other hand, the smoothing capacitor $C_2$ is connected to the grounded dc input terminal 5, and so is the second supply terminal $16_b$ of the switch control circuit 2.

The switch control circuit 2, the other primary component of the representative dc-to-dc converter, broadly comprises:

1. An output voltage detector circuit 17 for detecting the output voltage of the dc-to-dc converter circuit 1.

2. A switch control pulse generator circuit 18 for on-off control of the switch 7.
3. A mode selector circuit 19 connected to the switch control pulse generator circuit 18 for delivering thereto a mode select signal order to cause the same to drive the switch 7 in normal load mode (i.e. continuously) when the converter is loaded normally and in light load mode (i.e. at intervals) when the power requirement of the load 15 falls below a predetermined limit.
4. A light load mode override circuit 20 inserted between the mode selector circuit 19 and the switch control pulse generator circuit 18 for causing the latter to drive the switch 7 continuously during operation in light load mode when the output voltage of the second rectifying and smoothing circuit 10 is less than a predefined limit.

The output voltage detector circuit 17 is connected to the pair of dc output terminals 11 and 12 of the dc-to-dc converter circuit 1 via conductors 21 and 22, respectively, for providing an output voltage detect signal indicative of the dc output voltage. A more detailed construction of this output voltage detector circuit 17 is given in FIG. 2, to which reference will be had presently.

The switch control pulse generator circuit 18 is optically coupled to the output voltage detector circuit 17 for inputting the output voltage detect signal and connected to the current detect resistor 8 of the dc-to-dc converter circuit 1 via a conductor 23 for inputting the aforesaid current detect signal $V_i$. In response to these input signals the switch control pulse 18 generates switch control pulses for delivery to the gate of the switch 7 over a conductor 24. Although FIG. 1 shows the current detect resistor 8 as a part of the dc-to-dc converter circuit 1, external to the switch control pulse generator circuit 18, this resistor might be considered a part of the switch control pulse generator circuit as well. More will be said subsequently about this switch control pulse generator circuit 18, too, with reference to FIG. 2. The mode selector circuit 19 is equipped with means for generating the light load mode command.

Connected to the switch control pulse generator circuit 18 via a conductor 25, the mode selector circuit 19 inputs therefrom a voltage feedback signal $V_f$ indicative of the magnitude of the dc output voltage. The mode selector circuit 19 relies on this voltage feedback signal $V_f$ to provide the aforesaid mode select signal indicative of whether the switch 7 is to be driven in normal or light load mode depending upon whether the power requirement of the load 15 is less than the prescribed limit or not. The mode selector circuit 19 is also shown in detail in FIG. 2.

The light load mode override circuit 20 has an input connected to the positive supply terminal $16_a$ of the switch control circuit 2 by way of a conductor 26, another input connected to the mode selector circuit 19 by way of a conductor 27, and an output connected to the switch control pulse generator circuit 18 by way of a conductor 28. The light load mode override circuit 20 is equipped with means for judging whether the output voltage of the second rectifying and smoothing circuit 10 is less than the predetermined limit or not, and means for nullifying the light load mode command from the mode selector circuit 19 when it is. Contrary to the showing of FIG. 1, the light load mode override circuit 20 might be considered external to the switch control circuit 2. This circuit 20 is also shown in detail in FIG. 2.

Figure 2:
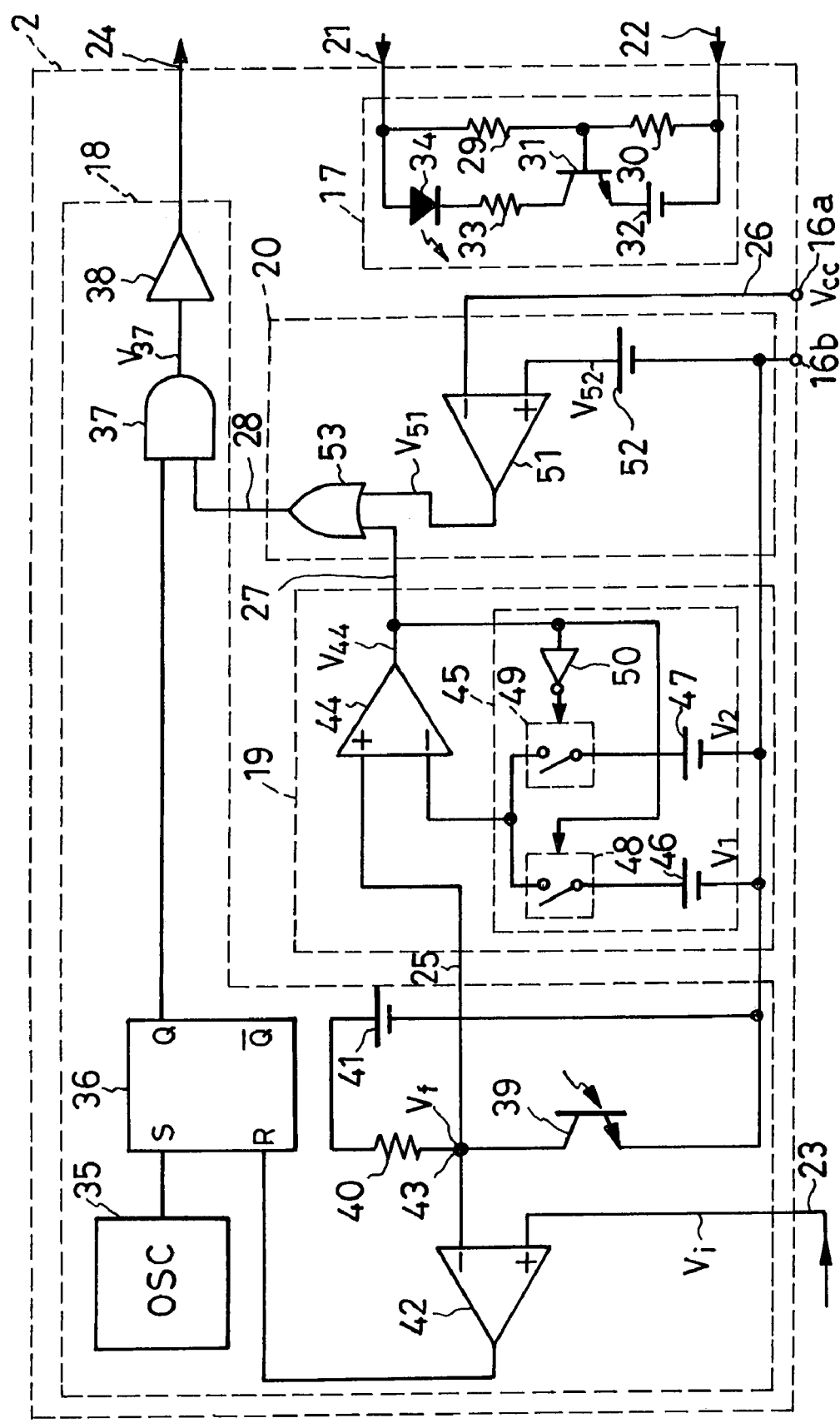
FIG. 2 is a schematic electrical diagram showing in more detail the switch control circuit of the dual-mode dc-to-dc converter of FIG. 1.
Figure 3:
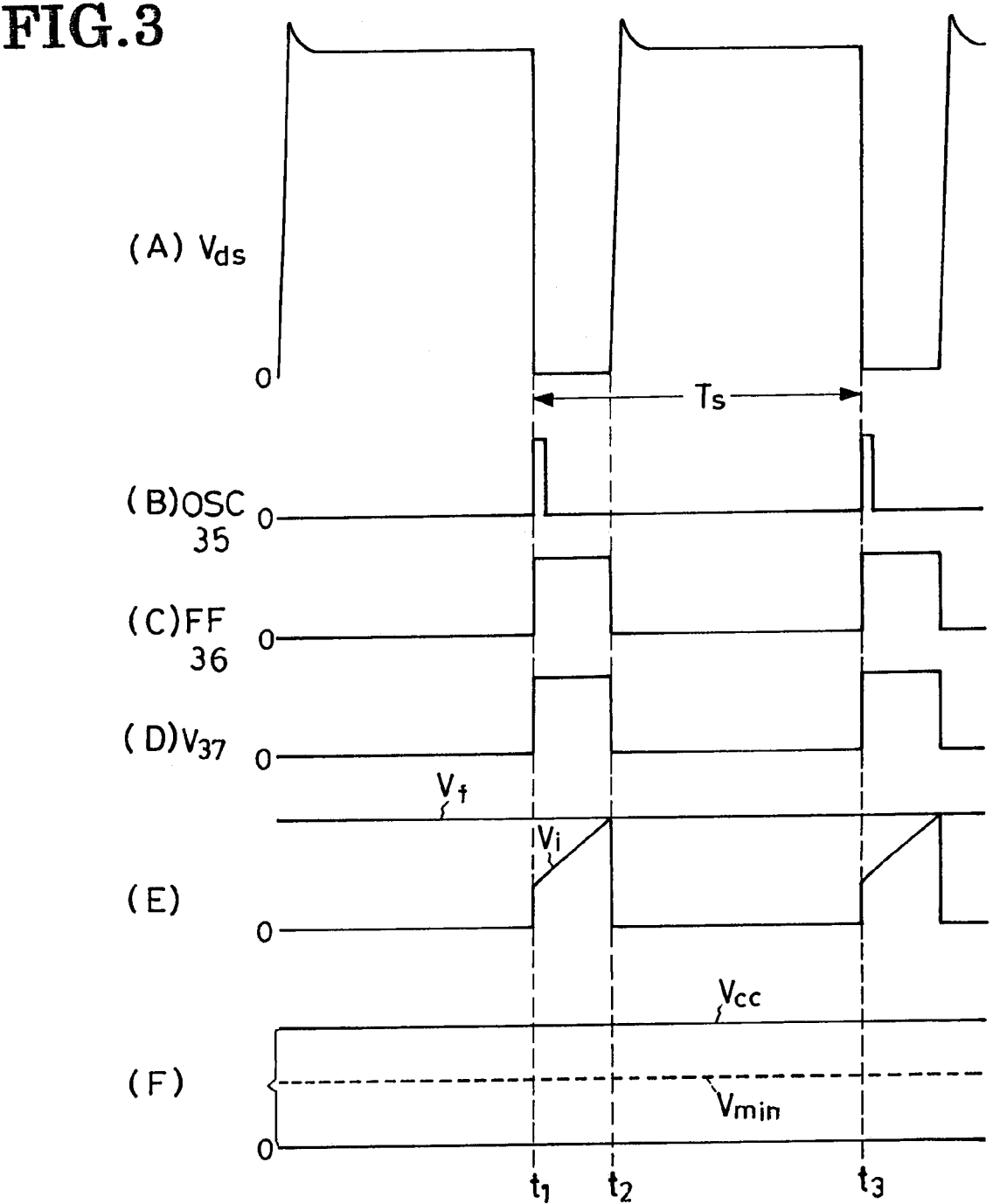
FIG. 3, consisting of (A) through (F), is a diagram of waveforms useful in explaining the operation of the dc-to-dc converter of FIGS. 1 and 2 in light load mode.

The reader's attention is now invited to FIG. 2. The following description of this figure will be better understood by referring to FIGS. 3–5 as well. FIG. 3 shows waveforms appearing in various parts of FIGS. 1 and 2 under normal load, and FIG. 4 the waveforms appearing in the same parts immediately before the beginning of light load mode. FIG. 5 shows some pertinent waveforms of the FIGS. 1 and 2 circuitry in normal load mode, in light load mode, and when the light load mode is cancelled.

Referring more specifically to FIG. 2, the output voltage detector circuit 17 comprises:
1. A serial connection of two voltage-dividing resistors 29 and 30 connected between the pair of dc output terminals 11 and 12, FIG. 1, by way of the conductors 21 and 22.
2. An npn transistor 31 having a base connected to the junction between the voltage-dividing resistors 29 and 30.
3. A zener diode or like reference voltage source 32 connected between the emitter of the transistor 31 and the conductor 22.
4. A light-emitting diode (LED) or like light source 34 connected between the collector of the transistor 31 and the conductor 21 via a current-limiting resistor 33.

The transistor 31 functions as differential amplifier, providing a current of a magnitude representative of the difference between the reference voltage from its source 32 and a fraction of the dc output voltage obtained by dividing the same by the resistors 29 and 30. Energized with this current, the LED 34 will radiate with an intensity proportional to the dc output voltage.

Figure 4:
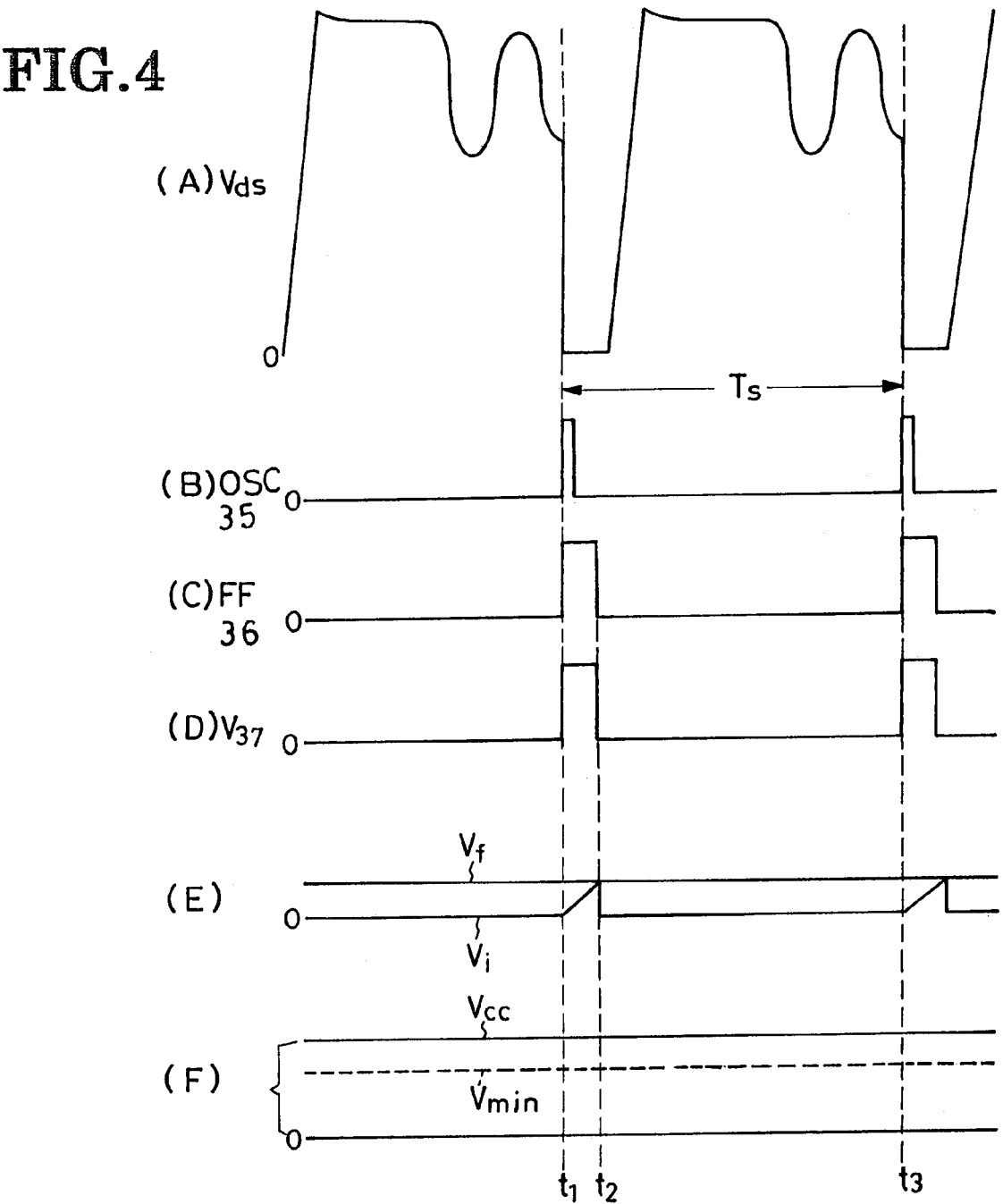
FIG. 4, consisting of (A) through (F), is a waveform diagram similar to FIG. 3 but explanatory of the operation of the dc-to-dc converter immediately before commencement of light load mode.
Figure 5:
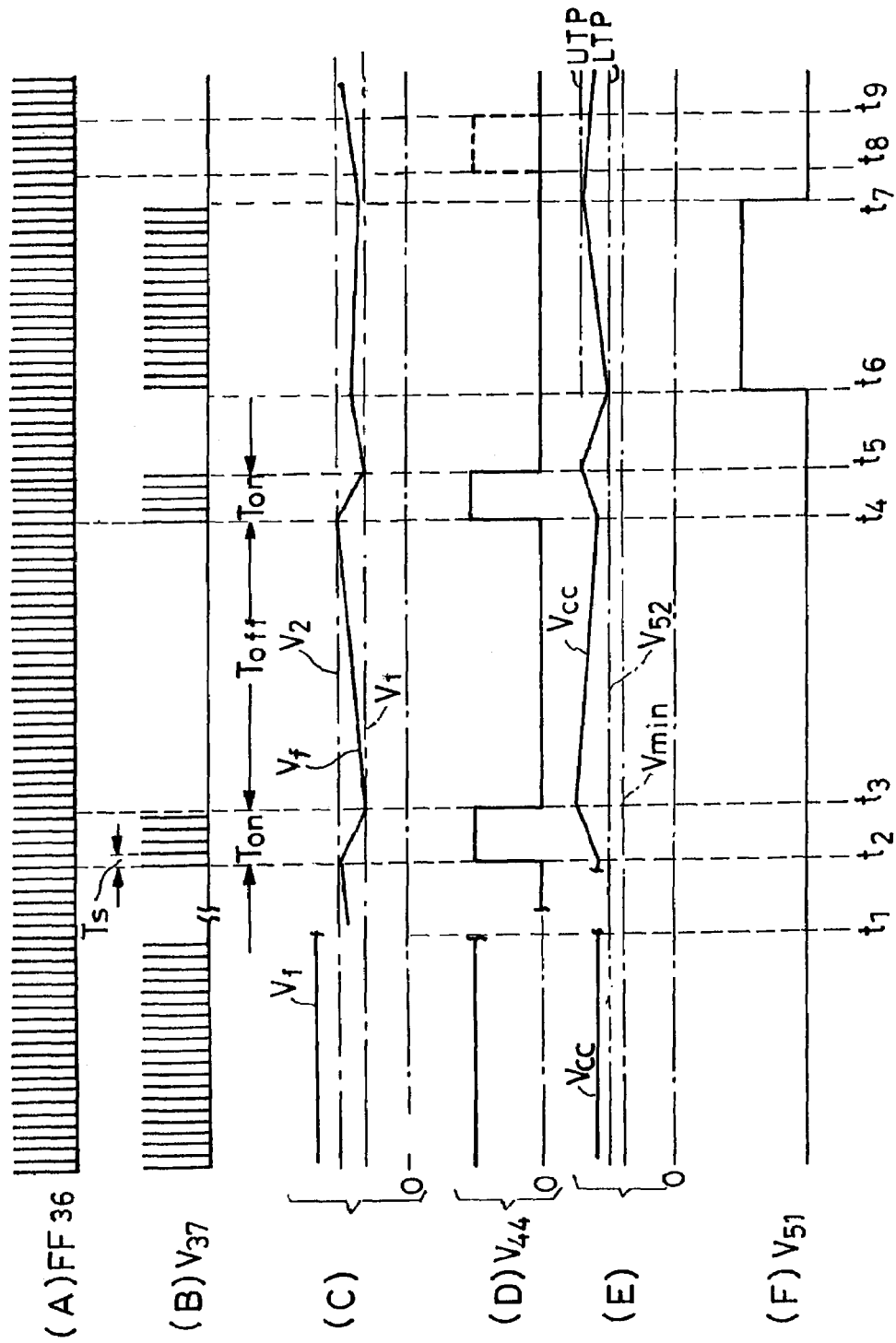
FIG. 5, consisting of (A) through (F), is a diagram of waveforms appearing at various parts of the dc-to-dc converter circuit of FIG. 2 in normal load mode, light load mode, and light load override mode.

The switch control pulse generator circuit 18 includes an oscillator or clock 35 which puts out accurately timed pulses at a recurrence rate of, say, 20 to 100 kilohertz, as indicated at (B) in both FIGS. 3 and 4. These clock pulses are directed into the set input S of an RS flip-flop 36.

The flip-flop 36 has a reset input R connected to a comparator 42. Thus, set by each clock pulse from the oscillator 35 and reset by the output from the comparator 42, the flip-flop 36 produces from its non-inverting output Q a series of rectangular pulses indicated at (C) in both FIGS. 3 and 4. These flip-flop output pulses are also shown at (A) in FIG. 5, in which each pulse is drawn as a simple straight line for convenience.

The output pulses from the Q output of the flip-flop 36 are directed into an AND gate 37, which has another input connected to the light load mode override circuit 20 by way of the conductor 28. Thus the AND gate 37 allows or inhibits the passage of the flip-flop output pulses therethrough depending upon the output from the light load mode override circuit 20. The resulting pulses issuing from the AND gate 37 are designated $V_{37}$ in FIGS. 2–5. These AND gate output pulses $V_{37}$ are delivered through a driver circuit 38 to the control terminal (gate of the FET in this case) of the switch 7, FIG. 1, over the conductor 24. The AND gate output pulses $V_{37}$ are therefore equivalent to the voltage regulator switch control pulses and will be hereinafter sometimes referred to as such or simply as switch control pulses or even more simply as control pulses. The switch control pulses are impressed between gate and source of the FET switch 7. The electrical connection between the driver circuit 38 and the source of the switch 7 is not shown for simplicity.

By controlling the passage of the flip-flop output pulses through the AND gate 37 as above, the output from the light load mode override circuit 20 sets up either of the following three modes of driving the switch 7:

1. Normal load mode:
The flip-flop output pulses are allowed through the AND gate 37 continuously, as indicated before $t_1$ at (B) in FIG. 5.

2. Light load mode:

The flip-flop output pulses are allowed through the AND gate 37 at intervals, as from $t_1$ to $t_6$ at (B) in FIG. 5.

3. Light load override mode:

The flip-flop output pulses are allowed through the AND gate 37 continuously by overriding the light load mode, as from $t_6$ to $t_7$ in FIG. 5.

The switch control pulse generator circuit 18 further includes a phototransistor 39 or like light receptor which is positioned to be irradiated by the LED 34 of the output voltage detector circuit 17. The phototransistor 39 is connected across a dc bias voltage source 41 via a resistor 40. The phototransistor 39, resistor 40 and bias voltage source 41 coact to provide a voltage feedback signal $V_f$ at the junction 43 between phototransistor 39 and resistor 40. The voltage feedback signal $V_f$ is in inverse proportion to the voltage between the pair of dc output terminals 11 and 12, FIG. 1.

The junction 43 between phototransistor 39 and resistor 40 is connected to the negative input of a comparator 42, the positive input of which is connected to the junction between switch 7 and current detect resistor 8 as gradient voltage generator means, both shown in FIG. 1, by way of the conductor 23. Thus, as indicated at (E) in FIG. 3, the comparator 42 compares the voltage feedback signal $V_f$ and the current detect signal $V_i$ as gradient voltage signal, the latter being as aforesaid a voltage signal indicative of the magnitude of the current flowing through the transformer primary $N_1$ and switch 7. The output of the comparator 42 is connected to the reset input R of the flip-flop 36.

It will be observed from FIG. 3 that the waveform of the current detect signal $V_i$ includes a gradient in synchronism with each conducting period of the switch 7. The comparator 42 goes high when the gradient of the current detect signal $V_i$ reaches the level of the voltage feedback signal $V_f$, thereby resetting the flip-flop 36. At (C) in both FIGS. 3 and 4 is shown the flip-flop 36 as being thus set at $t_1$ by an output pulse of the oscillator 35 and reset at $t_2$ by the high output from the comparator 42. Since the oscillator 35 puts out the clock pulses with a period $T_s$, the flip-flop 36 will be again set at $t_3$ in FIGS. 3 and 4, and the cycle of the $t_1$–$t_3$ period will repeat itself thereafter.

The dc output voltage of the converter will rise in proportion as the load thereon grows lighter, causing the voltage feedback signal $V_f$ at the junction 43 to become lower. The voltage feedback signal $V_f$ is shown at (E) in FIG. 4 as being lower than at (E) in FIG. 3, with the result that the sawtoothed current detect signal $V_i$ rises to the level of the voltage feedback signal $V_f$ in a shorter period of time. The flip-flop 36 is therefore reset earlier than in FIG. 3; in other words, as will be noted from (C) in both FIGS. 3 and 4, the output pulses of the flip-flop 36 become shorter in duration as the load becomes lighter. These shorter duration pulses will cause a corresponding decrease in both duration and duty ratio of the switch control pulses $V_{37}$ seen at (D) in FIGS. 3 and 4. Driven by these switch control pulses, the switch 7 will act to stabilize the dc output voltage, causing a drop after a brief rise.

The mode selector circuit 19, another component of the switch control circuit 2 first set forth with reference to FIG. 1, is also shown in detail in FIG. 2. It broadly comprises a comparator 44 and reference voltage generator circuit 45 for generating the mode select signal $V_{44}$, at (D) in FIG. 5, in response to the voltage feedback signal $V_f$ from the switch control pulse generator circuit 18. The comparator 44 has its positive input connected to the junction 43 between phototransistor 39 and resistor 40 of the switch control pulse generator circuit 18, and its negative input connected to the reference voltage generator circuit 45.

The reference voltage generator circuit 45 comprises, for hysteretic operation of the comparator 44, a first source 46 of a reference voltage $V_1$, and a second source 47 of a reference voltage $V_2$, both connected to the negative input of the comparator 44 via a first and a second on-off switch 48 and 49, respectively. The first reference voltage $V_1$ is less than the second reference voltage $V_2$ as at (C) in FIG. 5. The first on-off switch 48 has its control input connected directly to the output of the comparator 44 whereas the second on-off switch 49 has its control input connected to the same comparator output via an inverter 50. The first on-off switch 48 is therefore closed when the comparator output is high whereas the second on-off switch 49 is closed when the comparator output is low.

As indicated before $t_1$ at (C) in FIG. 5, the voltage feedback signal $V_f$ at the junction 43 is constantly higher than the two reference voltages $V_1$ and $V_2$ of the mode selector circuit 19 when the converter is loaded normally. Consequently, the comparator output $V_{44}$ is constantly high under normal load, as at (D) in FIG. 5, holding the first on-off switch 48 closed to connect the first reference voltage source 46 to the comparator 44. This high output $V_{44}$ from the comparator 44 enables the FIG. 5(A) output pulses of the flip-flop 36 to pass through the AND gate 37. FIG. 5 shows at (B) the switch control pulses $V_{37}$ thus applied constantly to the switch 7 until $t_1$.

The voltage feedback signal $V_f$ will become lower at $t_1$ when the load on the converter lightens. In light load mode after $t_1$ in FIG. 5 the output $V_{44}$ from the comparator 44 of the mode selector circuit 19 is shown at (D) in FIG. 5 to be high from $t_2$ to $t_3$. The output pulses of the flip-flop 36 are free to travel through the AND gate 37 during this $t_2$–$t_3$ period, it being understood that the light load mode override circuit 20 is inactive until $t_6$. The switch 7 is driven by the switch control pulses $V_{37}$, at (B) in FIG. 5, during the $t_2$–$t_3$ period. As the smoothing capacitors $C_1$ and $C_2$, FIG. 1, of the rectifying and smoothing circuits 9 and 10 are both charged, with a gradual rise in voltages across these capacitors, the voltage feedback signal $V_f$ will diminish until it equals the first reference voltage $V_1$ at $t_3$. Thereupon the comparator 44 will go low as at (D) in FIG. 5 thereby preventing the passage of the output pulses of the flip-flop 36 through the AND gate 37 and so suspending the driving of the switch 7.

The first on-off switch 48 of the mode selector circuit 19 is opened, and the second on-off switch 49 closed, at $t_3$ in FIG. 5 when the comparator 44 goes low as above. Now the comparator 44 starts comparing the voltage feedback signal $V_f$ against the second, higher reference voltage $V_2$. Hysteresis occurs thereupon, such that comparator 44 will remain low until $t_4$, as at (D) in FIG. 5.

The voltages across the smoothing capacitors $C_1$ and $C_2$ will both diminish as the switch 7 is left unactuated after $t_3$ in FIG. 5. The voltage feedback signal $V_f$ will rise gradually until it reaches the second reference voltage $V_2$ at $t_4$, as at (C) in FIG. 5, whereupon the comparator 44 will go high as at (D) in FIG. 5. Then the first on-off switch 48 will be closed, and the second on-off switch 49 opened, with the result that the same operation will occur from $t_4$ to $t_5$ as from $t_2$ to $t_3$.

Thus the output $V_{44}$ from the comparator 44, or from the mode selector circuit 19, constitutes the noted mode select signal which represents by its high state the periods $T_{on}$ during which the switch 7 is to be driven, and by its low state the periods $T_{off}$ during which the switch 7 is not. The mode select signal $V_{44}$ is constantly high, as before $t_1$ in FIG. 5, for causing the voltage regulator switch 7 to be driven in normal load mode, and at intervals, as from $t_1$ to $t_6$ in FIG. 5, for causing the switch 7 to be driven in light load mode.

Referring once again to FIG. 2, the light load mode override circuit 20 includes a hysteretic comparator 51 having a negative input connected to the control supply terminal $16_a$ and thence to the smoothing capacitor $C_2$, FIG. 1, of the second rectifying and smoothing circuit 10, and a positive input connected to a reference voltage source 52. Thus the comparator 51 constantly monitors the output voltage of the second rectifying and smoothing circuit 10 in reference to the reference voltage $V_{52}$. The output of the comparator 51 is connected to one of the two inputs of an OR gate 53, the other input of which is connected to the comparator 44 of the mode selector circuit 19 for inputting the mode select signal $V_{44}$. The OR gate 53 nullifies the light load mode command from mode selector circuit 19 when the output voltage of the second rectifying and smoothing circuit 10 falls below the reference voltage $V_{52}$.

The reference voltage $V_{52}$ is preset at the minimum allowable value, or between this minimum allowable value and normal value, of the supply voltage $V_{cc}$ of the switch control circuit 2; in other words, at a value higher than the highest of the voltages at which the switch control circuit 2 is incapable of operation.

The operation of the light load mode override circuit 20 will become apparent from a study of (E) and (F) in FIG. 5. The output $V_{51}$ from the comparator 51 will be low before $t_6$, as at (F) in FIG. 5, when the switch control circuit supply voltage $V_{cc}$ is higher than the reference voltage $V_{52}$ which represents the lower trip point (LTP) of the comparator hysteresis. The OR gate 53 will then not block the passage of the mode select signal $V_{44}$ therethrough. The comparator 51 will go high at $t_6$ when the switch control circuit supply voltage $V_{cc}$ drops to the LTP, and remain so by hysteresis until $t_7$ when the switch control circuit supply voltage builds up to the upper trip point (UTP).

Thus, even though the mode select signal $V_{44}$ is low after $t_5$, the OR gate 55 will be high from $t_6$ to $t_7$, enabling the AND gate 37 of the switch control pulse generator circuit 18 to put out the switch control pulses $V_{37}$ as at (B) in FIG. 5. The switch 7 will be driven during this $t_6$-$t_7$ period, earlier than the period $t_8$–$t_9$ during which the switch 7 was to be driven according to the light load mode which had been dictated by the mode select signal $V_{44}$. The smoothing capacitors $C_1$ and $C_2$ will both be charged rapidly as a result of the continuous driving of the switch 7 during the $t_6$-$t_7$ period. The switch control circuit 2 will be saved from going out of operation as the switch control circuit supply voltage $V_{cc}$ starts rising at $t_6$ and is so prevented from dropping below the minimum allowable value $V_{min}$.

The hysteresis of the comparator 51 of the light load mode override circuit 20 is desirable but not essential. Even without hysteresis the comparator 51 will stay high while the switch control circuit supply voltage $V_{cc}$ is undershooting the reference voltage $V_{52}$. This high state of the comparator 51 will be just as effective as that depicted from $t_6$ to $t_7$ at (F) in FIG. 5 to cancel the light load mode dictated by the mode select signal $V_{44}$ from the mode selector circuit 19, permitting the delivery of the control pulses $V_{37}$ to the switch 7.

The foregoing will have made clear how the invention succeeds in overriding the light load mode in the event of a drop in the switch control circuit supply voltage $V_{cc}$. The switch 7 is then automatically driven continuously until the voltage $V_{cc}$ returns to normal or thereabouts. As a consequence, the switch control circuit 2 is not to go out of operation during the progress of light load mode. The switch control circuit 2 will not stop operation, either, when the voltage $V_{cc}$ drops to a certain extent due to fluctuations in the dc input voltage. The dc-to-dc converter according to the invention is therefore favorable from the standpoints of both efficiency and stability of operation.

Figure 6:
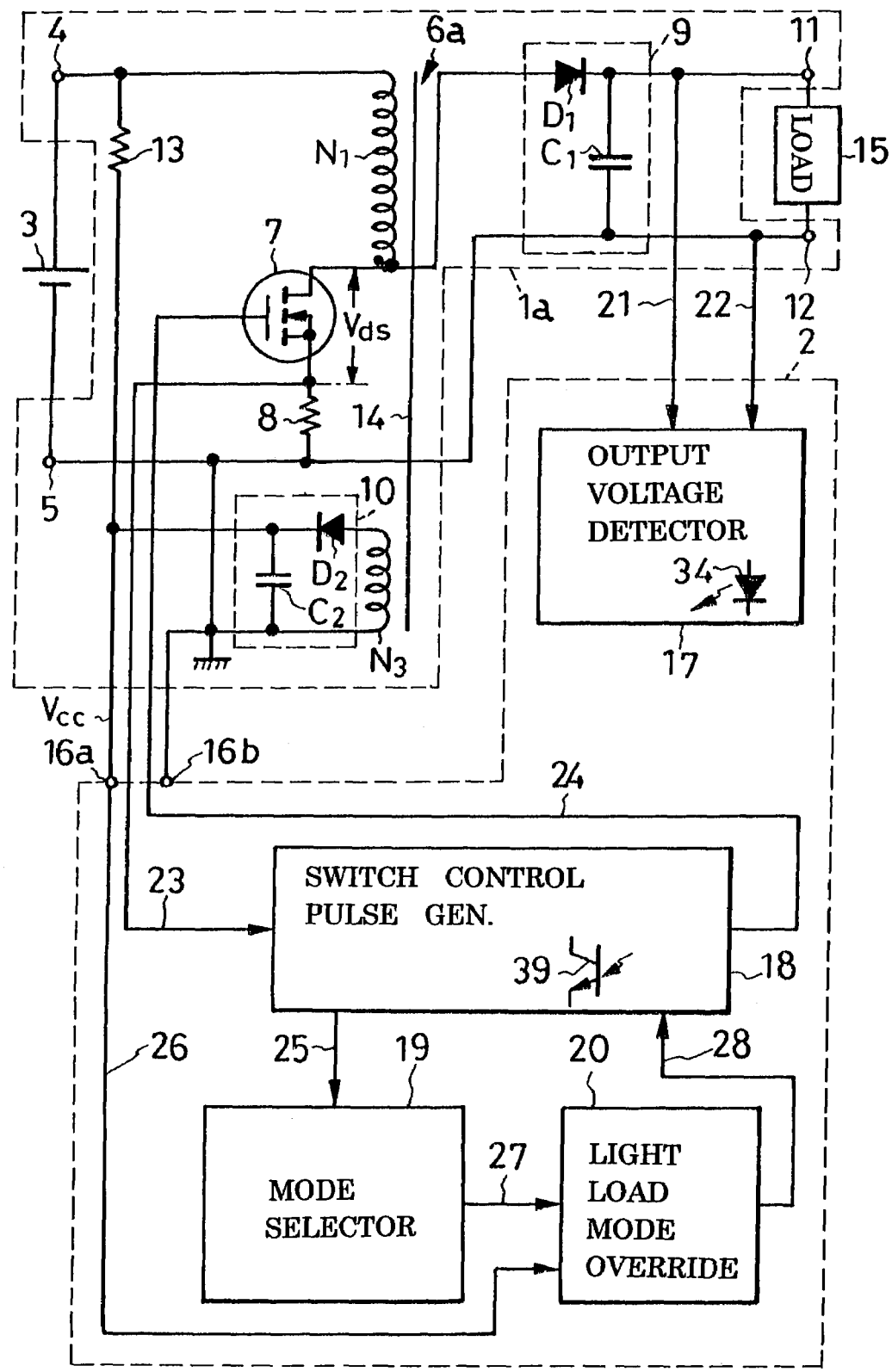
FIG. 6 is a diagram similar to FIG. 1 but showing a second preferred form of dual-mode dc-to-dc converter embodying the principles of this invention.

Embodiment of FIG. 6

The dc-to-dc converter of FIG. 6 includes a modified dc-to-dc converter circuit $1_a$ and the switch control circuit 2 of the same construction as its FIG. 1 counterpart. The modified dc-to-dc converter circuit $1_a$ includes a transformer $6_a$ which has no secondary winding; instead, has the first rectifying and smoothing circuit 9 is connected in parallel with the switch 7. This embodiment is identical with that of FIGS. 1–5 in all the other details of construction.

Energy is stored during each conducting period of the switch 7 on the inductive transformer primary $N_1$ as then the rectifying diode $D_1$ of the first rectifying and smoothing circuit 9 is reverse biased. The thus-stored energy is released from the transformer primary $N_1$ during the subsequent nonconducting period of the switch 7 as then the rectifying diode $D_1$ is forward biased. The smoothing capacitor $C_1$ of the first rectifying and smoothing circuit 9 is therefore charged by the resultant of the voltage across the dc power supply 3 and the voltage across the transformer primary $N_1$. Thus the embodiment of FIG. 6 represents an adaptation of the invention for a step-up switching regulator.

The winding $N_3$ of the modified transformer $6_a$ is connected to the second rectifying and smoothing circuit 10, as is the tertiary winding $N_3$ of the FIG. 1 transformer 6. The converter as a whole gains the same advantages as set forth in conjunction with the previous embodiment since it incorporates the switch control circuit 2 of the same construction as shown in FIG. 2.

Figure 7:
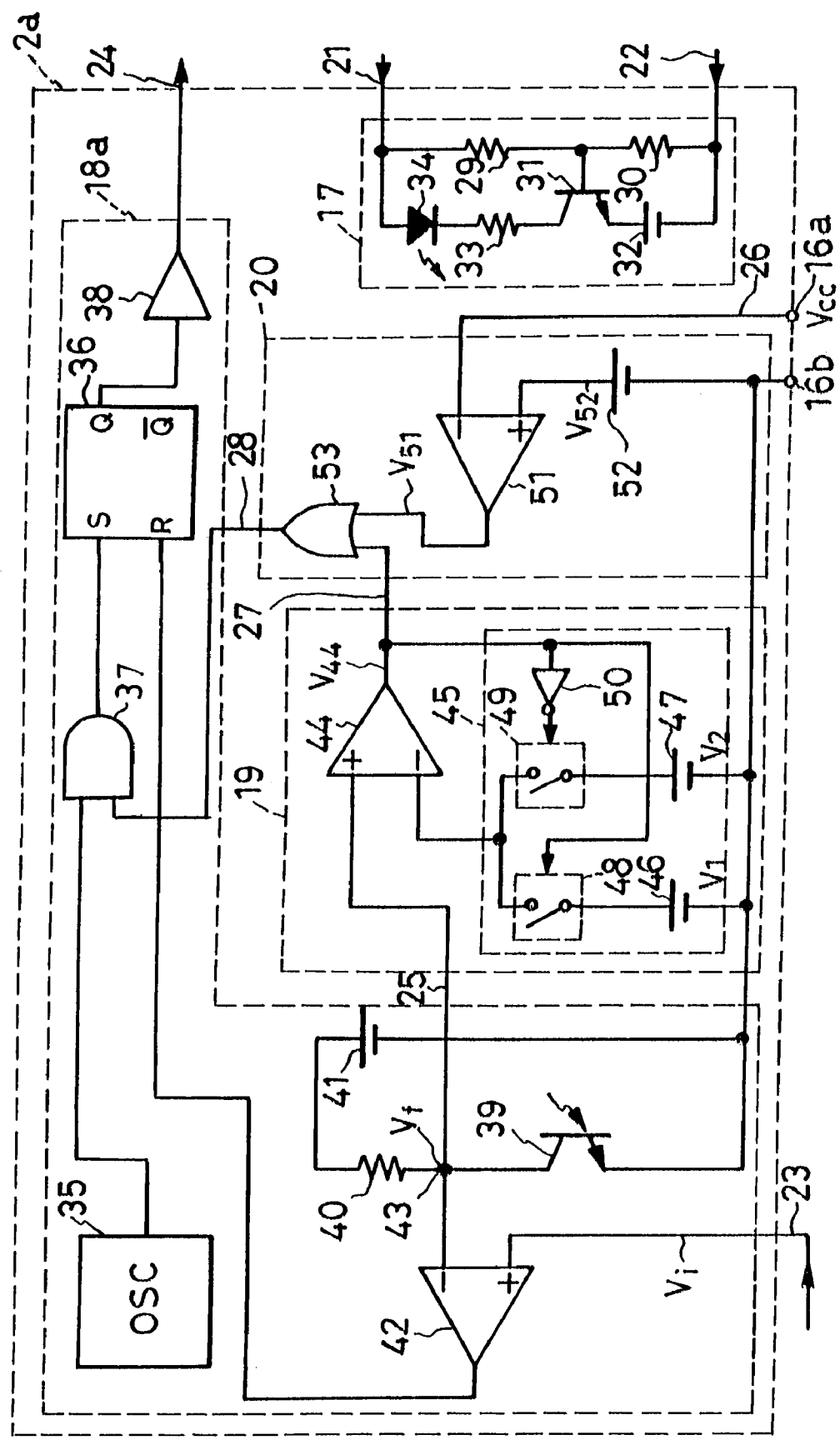
FIG. 7 is a diagram similar to FIG. 2 but showing a modified switch control circuit embodying the principles of this invention.

Embodiment of FIG. 7

FIG. 7 shows a modified switch control circuit $2_a$ for use in the dc-to-dc converter of FIG. 1 in substitution for the first disclosed switch control circuit 2 of FIG. 2. The modified switch control circuit $2_a$ features a modified switch control pulse generator circuit $18_a$ and has the output voltage detector circuit 18, mode selector circuit 19 and light load mode override circuit 20 of the same constructions as their FIG. 2 counterparts.

The modified switch control pulse generator circuit $18_a$ differs from its FIG. 2 counterpart only in that the AND gate 37 is connected between oscillator 35 and RS flip-flop 36. More specifically, the AND gate 37 has one input connected directly to the oscillator 35, another input connected to the OR gate 53 of the light load mode override circuit 20, and an output connected to the set input S of the flip-flop 36. This flip-flop 36 has its noninverting output Q connected to the driver circuit 38.

Such being the construction of the modified switch control pulse generator circuit $18_a$, the output pulses of the oscillator 35 are delivered to the set input S of the flip-flop 36 when the AND gate 37 is not disabled by the output from the OR gate 53 of the light load mode override circuit 20. The voltage regulator switch control pulses issuing from this modified switch control pulse generator circuit $18_a$ are therefore akin to those produced by the original switch control pulse generator circuit 18 of FIG. 2.

The modified switch control pulse generator circuit $18_a$ does, however, possess the advantage that the switch control pulses are free from chattering in the face of that of the comparator 44 of the mode selector circuit 19, or that of the comparator 51 of the light load mode override circuit 20, due to noise or the insufficient hysteresis of the comparator 44 or 51. This is because the flip-flop 36 remains set despite the chattering of the OR gate 53 of the light load mode override circuit 20 and, in consequence, that of the output of the AND gate 37 and of the set input to the flip-flop 36. The switch control pulse generator circuit 18 of FIG. 2 lacks this advantage.

Figure 8:
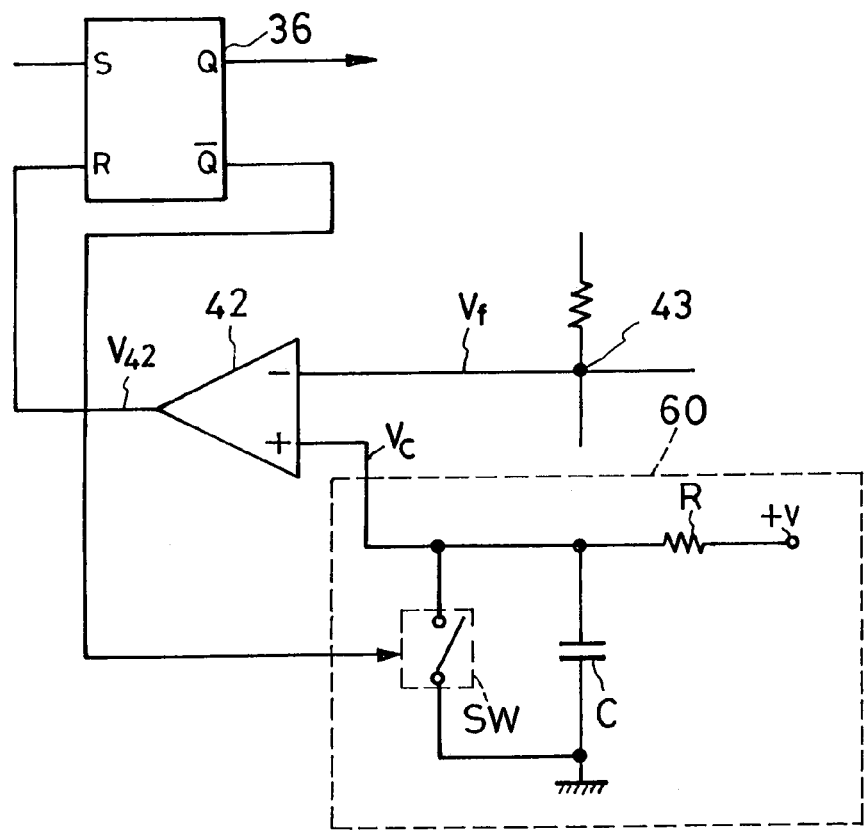
FIG. 8 is a partial schematic electrical diagram of a slight modification of the switch control circuit.
Figure 9:
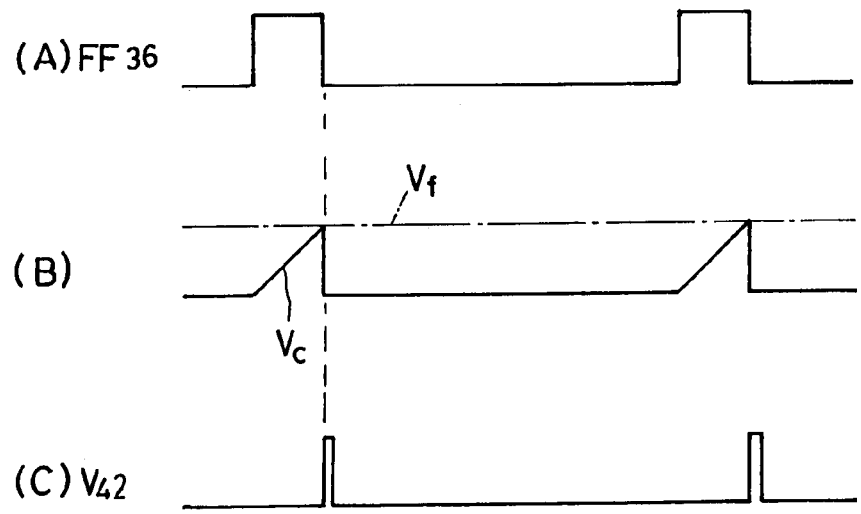
FIG. 9, consisting of (A) through (C), is a diagram of waveforms appearing at various parts of the FIG. 8 circuitry.

Embodiment of FIGS. 8 and 9

One of the inputs of the comparator 42, FIG. 2 or 7, of the switch control pulse generator circuit 18 or $18_a$ need not necessarily be connected to the junction between switch 7 and resistor 8, FIGS. 1 and 6, for inputting the sawtoothed current detect signal $V_1$ shown at (E) in FIGS. 3 and 4. FIG. 8 indicates at 60 an alternative circuit 60 connectable to the positive input of the comparator 42. The alternative circuit 60 could be called gradient voltage generator means. The gradient voltage generator circuit 60 comprises a capacitor C, a resistor R, and a switch SW. The capacitor C is charged from a dc supply terminal +V via the resistor R, providing a gradient voltage VC, at (B) in FIG. 9, during each conducting period of the switch 7. The switch SW is connected in parallel with the capacitor C for discharging the same in response to the inverting output from the flip-flop 36. The gradient voltage $V_c$ is applied to one input of the comparator 42, to the other input of which is impressed the voltage feedback signal $V_f$.

The comparator 42 goes high as at (C) in FIG. 9 when the gradient voltage $V_c$ rises to the voltage feedback signal $V_f$, resetting the flip-flop 36 as at (A) in FIG. 9. Thereupon the switch SW is closed by the inverting output from the flip-flop 36 thereby discharging the capacitor C.

Possible Modifications

Notwithstanding the foregoing detailed disclosure it is not desired that the present invention be limited by the exact showing of the drawings or the description thereof. The following is a brief list of possible modifications, alterations or adaptations of the illustrated embodiments which are all believed to fall within the purview of the invention:

1. The present invention is specifically directed to the improvements concerning the switch control circuit 2 or $2_a$, so that the dc-to-dc converter circuits shown at 1 in FIG. 1 and at $1_a$ in FIG. 6 are merely representative of many such circuits having a switch or switches to be driven controllably by the switch control circuit. Examples of additional known dc-to-dc converter circuits suitable for use with the improved switch control circuit of this invention include:
(a) Forward dc-to-dc converter.
(b) Half-bridge dc-to-dc converter having a pair of switches.
(c) Modified half-bridge dc-to-dc converter.
(d) Combination of a bridge inverter circuit, having four switches in connection, and an output rectifying and smoothing circuit.
(e) Combination of a push-pull inverter, comprising two switches and a transformer, and a rectifying and smoothing circuit.
2. The switche7 could be driven with a frequency variable with the load magnitude.
3. A hysteretic comparator could be employed as the comparator 44, FIGS. 2 and 7, of the mode selector circuit 19 and connected to a single reference voltage source instead of to the dual source circuit 45 shown in those figures.
4. Semiconductor switches other than the FET, such as a bipolar transistor and insulated-gate bipolar transistor, could be employed as the switch 7.
5. The optical coupling of the output voltage detector circuit 17, FIGS. 1 and 6, and switch control pulse generator circuit 18 or $18_a$ is not essential. For electric coupling, there may be produced in the output voltage detector circuit 17 a voltage feedback signal having a voltage in inverse proportion to the voltage between the pair of dc output terminals 11 and 12. This voltage feedback signal may then be directly applied to the comparator 42 of the switch control pulse generator circuit 18 or $18_a$.
6. A Hall generator or like magneto-electric converter could be employed in place of the current detect resistor 4.
7. The gates such as shown at 37 and 53 in FIGS. 2 and 7 are replaceable by other equivalent logic circuits.
8. The mode selector circuit 19, shown in detail in both FIGS. 2 and 7, is modifiable to determine the load magnitude from the current detect signal $V_i$.

What is claimed is:

1. A dc-to-dc converter operating in either normal load mode or light load mode depending upon the power requirement of a load, with a capability of automatically overriding the light load mode under extremely light load, comprising:
(A) a dc-to-dc converter circuit comprising:
  (a) dc input means;
  (b) a transformer;
  (c) a switch connected to the dc input means via the transformer;
  (d) dc output means to be connected to a load to be powered;
  (e) a first rectifying and smoothing circuit connected between the transformer and the dc output means for supplying dc power to the load; and
  (f) a second rectifying and smoothing circuit connected to the transformer; and
(B) a switch control circuit connected to the switch of the dc-to-dc converter circuit for controllably driving the switch, and to the second rectifying and smoothing circuit of the dc-to-dc converter circuit thereby to be powered, the switch control circuit comprising:
  (a) a switch control pulse generator circuit connected to the switch of the dc-to-dc converter circuit, the switch control pulse generator circuit generating switch control pulses thereby to controllably drive the switch according to the power requirement of the load;
  (b) a mode selector circuit connected to the switch control pulse generator circuit for causing the same to drive the switch in normal load mode, in which the switch control pulses are applied to the switch continuously, when the power requirement of the load is above a predefined value, and in light load mode, in which the switch control pulses are applied to the switch at intervals, when the power requirement of the load is below the predefined value; and
  (c) a light load mode override circuit connected between the second rectifying and smoothing circuit of the dc-to-dc converter circuit and the switch control pulse generator circuit for overriding the light load mode, and causing the switch control circuit to apply the switch control pulses to the switch continuously, when an output voltage of the second rectifying and smoothing circuit of the dc-to-dc converter circuit falls below a predefined value.

2. A dc-to-dc converter as defined in claim 1, wherein the predefined value of the output voltage of the second rectifying and smoothing circuit is less than a rated value of the output voltage of the second rectifying and smoothing circuit and not less than a minimum allowable value at which the switch control circuit is capable of operation.

3. A dc-to-dc converter as defined in claim 1, wherein the switch control circuit further comprises an output voltage detector circuit connected to the dc output means for providing an output indicative of the dc output voltage of the first rectifying and smoothing circuit, and wherein the switch control pulse generator circuit is coupled to the output voltage detector circuit for generating the switch control pulses so as to stabilize the dc output voltage in response to the output from the output voltage detector circuit.

4. A dc-to-dc converter as defined in claim 3, wherein the mode selector circuit of the switch control circuit has an input connected to the switch control pulse generator circuit for inputting therefrom a voltage feedback signal indicative of the magnitude of the dc output voltage, the mode selector circuit relying on the voltage feedback signal for generating a mode select signal which is applied to the switch control pulse generator circuit for causing the same to drive the switch in either normal or light load mode.

5. A dc-to-dc converter as defined in claim 4, wherein the light load mode override circuit of the switch control circuit includes a logic circuit for nullifying the mode select signal when the same dictates the light load mode.

6. A dc-to-dc converter as defined in claim 3, wherein the switch control pulse generator circuit comprises:
   (a) gradient voltage generator means for generating a gradient voltage signal in the conducting periods of the switch;
   (b) feedback means for generating, in response to the output from the output voltage detector circuit, a voltage feedback signal indicative of the magnitude of the dc output voltage of the first rectifying and smoothing circuit;
   (c) a comparator connected to the gradient voltage generator means and the feedback means for comparing the gradient voltage signal and the voltage feedback signal;
   (d) a source of clock pulses;
   (e) an RS flip-flop having a first input connected to the clock pulse source and a second input connected to the comparator for providing the switch control pulses;
   (f) a logic circuit having a first input connected to the flip-flop, and a second input connected to the light load mode override circuit, for blocking the switch control pulses as dictated by an output from the light load mode override circuit; and
   (g) driver means connected between the logic circuit and the voltage regulator switch for driving the latter in response to the switch control pulses issuing from the former.

7. A dc-to-dc converter as defined in claim 3, wherein the switch control pulse generator circuit comprises:
   (a) gradient voltage generator means for generating a gradient voltage signal in the conducting periods of the switch;
   (b) feedback means for generating, in response to the output from the output voltage detector circuit, a voltage feedback signal indicative of the magnitude of the dc output voltage of the first rectifying and smoothing circuit;
   (c) a comparator connected to the gradient voltage generator means and the feedback means for comparing the gradient voltage signal and the voltage feedback signal;
   (d) a source of clock pulses;
   (e) a logic circuit having a first input connected to the clock pulse source, and a second input connected to the light load mode override circuit, for blocking the block pulses as dictated by an output from the light load mode override circuit;
   (f) an RS flip-flop having a first input connected to the logic circuit and a second input connected to the comparator for providing the switch control pulses; and
   (g) driver means connected between the flip-flop and the voltage regulator switch for driving the latter in response to the switch control pulses issuing from the former.

8. A dc-to-dc converter as defined in claim 1, wherein the light load mode override circuit comprises:
   (a) a comparator for comparing the output voltage of the second rectifying and smoothing circuit of the dc-to-dc converter circuit and a reference voltage; and
   (b) a logic circuit having a first input connected to the comparator and a second input connected to the mode selector circuit.

* * * * *

UNITED STATES PATENT AND TRADEMARK OFFICE
CERTIFICATE OF CORRECTION

PATENT NO. : 6,972,970 B2
DATED : December 6, 2005
INVENTOR(S) : Tomoyasu Yamada It is certified that error appears in the above-identified patent and that said Letters Patent is hereby corrected as shown below:

Column 11,
Line 24, delete "VC" and insert -- $V_c$ --.
Line 64, delete "switche7" and insert -- switch 7 --.

Signed and Sealed this

Twenty-eighth Day of March, 2006

JON W. DUDAS
*Director of the United States Patent and Trademark Office*